United States Patent
Oshibuchi et al.

[15] 3,635,714
[45] Jan. 18, 1972

[54] PHOTOGRAPHIC FILMS CONTAINING ANTI-STATIC SCRATCH-PREVENTING BACKING LAYERS

[72] Inventors: Koji Oshibuchi; Masayoshi Mayama, both of Tokyo, Japan

[73] Assignee: Konishiroku Photo Industry Co., Ltd., Tokyo, Japan

[22] Filed: July 7, 1970

[21] Appl. No.: 53,014

[52] U.S. Cl. ............................96/87 A, 96/87 R, 96/114.2, 117/76 F
[51] Int. Cl. .........................................................G03c 1/82
[58] Field of Search..........................96/87 A, 114.2, 87, 67; 117/76 F

[56] References Cited

UNITED STATES PATENTS 2,527,267  10/1950  Hart et al. ..............................96/87 A
2,420,610   5/1947  Mueller..................................96/87 A

FOREIGN PATENTS OR APPLICATIONS 1,284,295  11/1968  Germany ..............................96/87 A
  819,945   9/1959  Great Britain

*Primary Examiner*—Ronald H. Smith
*Attorney*—Harry C. Bierman, Jordan B. Bierman and Bierman & Bierman

[57] ABSTRACT

A photographic film having successively on the backside of the support a polyvinyl acetal resin layer containing a matting agent and a polyvinyl acetal resin layer containing a phosphoric acid ester of a higher alcohol or amine salt thereof.

2 Claims, No Drawings

PHOTOGRAPHIC FILMS CONTAINING ANTI-STATIC SCRATCH-PREVENTING BACKING LAYERS

The present invention relates to photographic films among light-sensitive photographic materials, and the object of the invention is to provide photographic films having improved scratch-preventing effects and antistatic effects.

As is well known, cellulose triacetate, polyethylene terephthalate and the like plastics films, which are used as supports for photographic films, tend to be scratched due to abrasion with various equipments, and have had such drawbacks that during the production or application of photographic films, they form scratches owing to abrasion with production equipments, cameras, developing means or printers, and, when the photographic films are printed, the resulting prints bear undesired images corresponding to said scratches to injure the qualities thereof to a great extent. Furthermore, the plastic films have also had such drawbacks that they tend to be electrically charged due to abrasion or peeling, so that photographic films using the plastic films as supports are liable to be greatly charged owing to abrasion or peeling, with the result that dust is absorbed on the film surfaces to induce the formation of scratches or to deteriorate other photographic properties. In case the photographic films have been greatly charged, the light-sensitive layers thereof are adversely affected owing to the discharge of said electric charge to cause such injury as to form so-called static marks, and, when the photographic films are printed, the resulting prints exhibit the traces of the dust and static marks to greatly injure the qualities thereof.

In order to overcome the above-mentioned drawbacks, there have heretofore been attempted various processes such as, for example, a process in which a layer of vinyl acetate-vinyl chloride copolymer containing an antistatic agent is applied onto the surface of the plastic film; a process in which both a layer of a vinyl acetate-vinyl chloride copolymer and a layer containing an antistatic agent are superposed onto the film surface; and a process in which a polyamide is used in place of the vinyl acetate-vinyl chloride copolymer on the film surface. These processes, however, have any of such drawbacks that the antistatic agent used is low in compatibility with the resin, the two layers to be applied are not sufficient in mutual adhesion, and the application of said layers have such detrimental effects on photographic properties as desensitization, increase in fog and variation in gamma value.

As the result of extensive studies, we have found that when a first layer which is a polyvinyl acetal resin layer containing a matting agent in which the aldehyde acetal content of vinyl alcohol is more that 50 mole percent and a second layer which is a polyvinyl acetal resin layer containing a phosphoric acid ester of higher alcohol or an amine salt thereof in which the aldehyde acetal content of vinyl alcohol is more than 50 mole percent are successively applied onto the back side of a support of a photographic film so that the first layer is greater in thickness than the second layer, the photographic film comes to display quite excellent scratch-preventing effect and antistatic effect.

The above-mentioned polyvinyl acetal resin used in the present invention is required to be such that the aldehyde acetal content of vinyl alcohol should be more than 50 mole percent, and no such effects as mentioned above can be attained if the said content is less than 50 mole percent. Further, the balance is desirably a vinyl alcohol, a vinyl ester or a modified vinyl alcohol.

Ordinarily, a polyvinyl acetal is obtained by reacting a polyvinyl alcohol with one or more of such aldehydes as formaldehyde, acetaldehyde, butylaldehyde, benzaldehyde, methylbenzaldehyde and methoxybenzaldehyde. In this case, the vinyl alcohol component tends to remain in the resulting polyvinyl acetal. In the case of the polyvinyl acetal employed in the present invention, the said alcohol component may have been left as it is or may have been modified by esterification or the like.

The polyvinyl acetal resin used as the first layer may be identical with or different from that used as the second layer so far as the first layer is greater in thickness than the second layer. It is desirable that the amount of the resin used as the first layer is 1 to 10 g./m.$^2$, while that of the resin used as the second layer is 10 to 100 mg./m.$^2$.

The matting agent employed in the present invention is preferably an organic matting agent which is composed mainly of the pearl polymerization product of styrene or methyl methacrylates. However, silicon dioxide, titanium dioxide, barium sulfate or the like inorganic matting agent may also be used. The particle diameter of said matting agent is preferably 1 to 10 $\mu$. In case the particle diameter is small, the matting agent is required to be used in a large amount, while in case the particle diameter is large, it may be used in a small amount. The matting agent can be used in an amount of 0.5 to 50 mg./m.$^2$, preferably 2 to 20 mg./m.$^2$. If necessary, the matting agent such as silicon dioxide or the like may be dispersed in the second layer. In this case, the particle diameter of the matting agent is desirably less than 1 $\mu$.

The phosphoric acid ester used in the present invention is a phosphoric acid ester of a higher alcohol having eight to 22 carbon atoms, preferably 12 to 18 carbon atoms, and is used either as it is or in the form of an amine salt. Phosphoric acid esters suitable for the object of the present invention are monolauryl, dilauryl, trilauryl, monohexadecyl, dihexadecyl, trihexadecyl, monooctadecyl, dioctadecyl, trioctadecyl, monobutylphenyl, dibutylphenyl, mononylphenyl and dinonylphenyl phosphates. These are used either as they are or in the form of triethanolamine, diethanolamine, monoethanolamine, triethylamine, diethylamine, monoethylamine and the like amine salts. Such phosphoric acid ester or amine salt is used in an amount of 5 to 30 percent by weight based on the weight of the second polyvinyl acetal resin layer.

The polyvinyl acetal resin layer containing the matting agent or the phosphoric acid ester of higher alcohol may be formed on a plastic film in such a manner that the resin is dissolved in a suitable solvent and the resulting solution is applied onto the surface of the plastic film by a suitable means such as coating, spraying or dipping and then dried.

The thus obtained plastic film support is provided on the side having no polyvinyl acetal resin layer with a light-sensitive layer by an ordinary procedure, whereby the photographic film of the present invention can be produced. This photographic film is not only successfully prevented from the formation of scratches due to abrasion with various equipments but also is inhibited from the generation of static charge due to abrasion or peeling. Moreover, the photographic film is free from such deterioration in other photographic properties as, for example, decrease in speed, increase in fog and variation in gamma.

The present invention is illustrated in further detail below with reference to examples.

EXAMPLE 1

Gosenol G (a polyvinyl alcohol having an acetylation degree of 12 mole percent; a product of Nippon Gosei Kagaku Kogyo K.K.) was reacted according to a known process with acetaldehyde to obtain a polyvinyl acetal resin (I) having an acetalation degree of 58 mole percent and an acetylation degree of 12 mole percent. Ten grams of this resin was dissolved in a mixed solvent comprising 70 ml. of methanol and 30 ml. of acetone to form a solution (A). In the thus formed solution was dispersed 5 mg. of a matting agent which had been obtained by pearl polymerization of styrene. The resulting dispersion (B) was coated on one side of a cellulose triacetate film in a proportion of 50 ml./m.$^2$ and then dried to prepare a first layer-bearing cellulose triacetate film (1).

On the other hand, Gosenol N (a polyvinyl alcohol produced by Nippon Gosei Kagaku Kogyo K.K.) was reacted according to a known process with benzaldehyde to obtain a polyvinyl acetal resin (II) having a benzalation degree of 75 mole percent. 400 mg. of the resin (II) and 30 mg. of triethanolamine dilauryl phosphate were dissolved in a mixed solvent comprising 50 ml. of benzene, 10 ml. of ethylene chloride and 40 ml. carbon tetrachloride to form a solution (C).

The solution (C) was applied onto the first layer formed on the film (1) in a proportion of 20 ml./m.$^2$ and then dried to form a second layer, whereby a cellulose triacetate film (2) having the first and second layers was obtained. The film (2) was used as a support and subbed on the uncoated side, and a light-sensitive emulsion was coated on the sublayer and then dried to prepare a photographic film ($a$) of the present invention. The photographic film ($a$) was subjected to tests under a series of conditions such as taking of photograph by use of a camera, development and printing. As a result, the printed image obtained was substantially free from the traces of scratches, static marks and dust.

For comparison, there were prepared a photographic film ($b$) using the film (1) as the support; a photographic film ($c$) using as the support a film having only the second layer; a photographic film ($d$) using as the support a film obtained by coating on the first layer of the film (1) a solution formed in the same manner as in the case of the solution (C), except that the triethanolamine dilauryl phosphate was not used; a photographic film ($e$) using as the support a film obtained by coating the aforesaid solution (C) on a layer, which had been formed in such a manner that the aforesaid solution (A) was coated on a cellulose triacetate film and then dried, and drying the said solution; a photographic film ($f$) using as the support a film obtained by coating the aforesaid solution (A) on a cellulose triacetate film; and a photographic film ($g$) using as the support a film obtained by coating on a cellulose triacetate film a solution formed in the same manner as in the case of the aforesaid solution (C), except that the triethanolamine dilauryl phosphate was not used, and then drying the solution. These photographic films were treated in the same manner as in the case of the aforesaid photographic film ($a$) of the present invention, whereby considerable traces of scratches, static marks and dust were observed in the printed images obtained from the photographic films ($b$) to ($g$).

EXAMPLE 2

Four grams of Vinylek F (a polyvinyl acetal resin having a formalation degree of 81 mole percent, a product of Chisso K.K.) (III) was dissolved in a mixed solvent comprising 40 ml. of chloroform, 40 ml. of acetone, 5 ml. of methanol and 15 ml. of carbon tetrachloride to form a solution (D). In this solution were dispersed 30 mg. of silicon dioxide particles having an average particle diameter of 3 $\mu$. The resulting dispersion (E) was coated on one side of a cellulose triacetate film in a proportion of 50 ml./m.$^2$ and then dried to prepare a first layer-bearing cellulose triacetate film (3). Subsequently, 100 mg. of the polyvinyl acetal resin (I) obtained in example 1 and 20 mg. of a 2:3 (molar ratio) mixture of triethylamine dihexadecyl phosphate and triethylamine monohexadecyl phosphate were dissolved in a mixed solvent comprising 70 ml. of ethanol and 30 ml. of acetone to form a solution (F). The solution (F) was coated on the first layer of the film (3) in a proportion of 20 ml./m.$^2$ and then dried to form a second layer, whereby a cellulose triacetate film (4) having the first and second layers was obtained. The film (4) was used as a support and subbed on the uncoated side, and a light-sensitive emulsion was coated on the sub layer and then dried to prepare a photographic film ($h$) of the present invention. The photographic film ($h$) was treated in the same manner as in example 1 to obtain a printed image. The thus obtained printed image was substantially free from the traces of scratches, static marks and dust, and showed no deterioration in photographic properties.

For comparison, there were prepared a photographic film ($i$) using film (3) as the support; a photographic film ($j$) using as the support a film having only the second layer; a photographic film ($k$) using as the support a film obtained by coating on the first layer of the film (3) a solution formed in the same manner as in the case of the aforesaid solution (F), except that the triethylamine dihexadecyl phosphate and triethylamine monohexadecyl phosphate were not used; a photographic film ($l$) using as the support a film obtained by coating the aforesaid solution (F) on a layer, which had been formed in such a manner that the aforesaid solution (D) was coated on a cellulose triacetate film and then dried, and drying the said solution; a photographic film ($m$) using as the support a film obtained by coating the aforesaid solution (D) on a cellulose triacetate film and then drying the solution; and a photographic film ($n$) using as the support a film obtained by coating on a cellulose triacetate film a solution formed in the same manner as in the case of the aforesaid solution (F), except that the triethylamine dihexadecyl phosphate and triethylamine monohexadecyl phosphate were not used, and then drying the solution. These photographic films were treated in the same manner as in the case of the aforesaid photographic film ($h$) of the present invention, whereby considerable traces of scratches, static marks and dust were observed in the printed images obtained from the photographic films ($i$) to ($n$).

EXAMPLE 3

Fifteen grams of the aforesaid Vinylek F was dissolved in a mixed solvent comprising 95 ml. of ethylene dichloride and 5 ml. of phenol to form a solution (G). In this solution were dispersed 20 mg. of barium sulfate particles having an average particle diameter of 1.5 $\mu$. The resulting dispersion (H) was coated on one side of a polyethylene terephthalate film in a proportion of 50 ml./m.$^2$ and then dried to prepare a first layer-bearing polyethylene terephthalate film (5).

Subsequently, 200 mg. of Eslek B (a polyvinyl acetal resin having a butyration degree of 60 mole percent, a product of Sekisui Kagaku Kogyo K.K.), 20 mg. of triethylamine monooctadecyl phosphate and 10 mg. of triethylamine monobutylphenyl phosphate were dissolved in a mixed solvent comprising 50 ml. of methanol and 50 ml. of acetone to form a solution (I). This solution was coated on the first layer of the film (5) in a proportion of 20 ml./m.$^2$ to form a second layer, whereby a polyethylene terephthalate film (6) having the first and second layers was obtained. The film (6) was used as a support and subbed on the uncoated side, and a light-sensitive emulsion was coated on the sub layer and then dried to prepare a photographic film ($o$) of the present invention. The photographic film ($o$) was treated in the same manner as in example 1 to obtain a printed image. The thus obtained printed image was substantially free from the traces of scratches, static marks and dust, and showed no deterioration in photographic properties.

For comparison, there were prepared a photographic film ($p$) using the film (5) as the support; a photographic film ($q$) using as the support a film having only the second layer; a photographic film ($r$) using as the support a film obtained by coating on the first layer of the film (5) a solution formed in the same manner as in the case of the aforesaid solution (I), except that the triethylamine monooctadecyl phosphate and triethylamine monobutylphenyl phosphate were not used; a photographic film ($s$) using as the support a film obtained by coating the aforesaid solution (I) on a layer, which had been formed in such a manner that the aforesaid solution (G) was coated on a polyethylene terephthalate film and then dried, and drying the said solution; a photographic film ($t$) using as the support a film obtained by coating the aforesaid solution (G) on a polyethylene terephthalate film and then drying the solution; and a photographic film ($u$) using as the support a film obtained by coating on a polyethylene terephthalate film a solution formed in the same manner as in the case of the aforesaid solution (I), except that the triethylamine monooctadecyl phosphate and triethylamine monobutylphenyl phosphate were not used, and then drying the solution. These photographic films were treated in the same manner as in the case of the photographic film ($o$) of the present invention, whereby considerable scratches, static marks and dust were observed in the printed images obtained from the photographic films (p) to (u).

What is claimed is:

1. A photographic film having successively on the backside of the support of the photographic film a polyvinyl acetal resin layer containing a matting agent and a polyvinyl acetal resin layer containing a phosphoric acid ester of higher alcohol or an amine salt thereof.

2. A photographic film having successively on the backside of the support of the photographic film a first layer composed of a polyvinyl acetal resin layer containing a matting agent in which the aldehyde acetal content of vinyl alcohol is more than 50 mole percent and a second layer composed of a polyvinyl acetal resin layer containing a phosphoric acid ester of higher alcohol or an amine salt thereof in which the aldehyde acetal content of vinyl alcohol is more than 50 mole percent, the first layer being greater in thickness than the second layer.